United States Patent
Sonnleitner et al.

(10) Patent No.: US 9,604,654 B2
(45) Date of Patent: Mar. 28, 2017

(54) ARRANGEMENT FOR SUPPLYING A RAIL VEHICLE WITH ELECTRICAL ENERGY

(71) Applicant: Bombardier Transportation GmbH, Berlin (DE)

(72) Inventors: Werner Sonnleitner, Ahnatal (DE); Andreas Buchner, Zurich (CH); Michael Kretz, Staufen (CH)

(73) Assignee: Bombardier Transportation GmbH, Berlin (DE)

( * ) Notice: Subject to any disclaimer, the term of this patent is extended or adjusted under 35 U.S.C. 154(b) by 0 days.

(21) Appl. No.: 14/785,077

(22) PCT Filed: Apr. 15, 2014

(86) PCT No.: PCT/EP2014/057613
§ 371 (c)(1),
(2) Date: Oct. 16, 2015

(87) PCT Pub. No.: WO2014/170321
PCT Pub. Date: Oct. 23, 2014

(65) Prior Publication Data
US 2016/0075345 A1 Mar. 17, 2016

(30) Foreign Application Priority Data
Apr. 18, 2013 (DE) .................. 10 2013 207 047

(51) Int. Cl.
*B61C 17/00* (2006.01)
*B61K 9/02* (2006.01)
(Continued)

(52) U.S. Cl.
CPC ............. *B61C 17/00* (2013.01); *B60K 6/46* (2013.01); *B60L 1/003* (2013.01); *B60L 1/02* (2013.01);
(Continued)

(58) Field of Classification Search
CPC ................................. B60K 6/46; B60L 1/02
(Continued)

(56) References Cited

U.S. PATENT DOCUMENTS

| 4,424,775 A * | 1/1984 | Mayfield, Jr. .......... F01M 5/001 123/142.5 R |
| 8,534,198 B2 * | 9/2013 | Matthys .................. B61C 17/00 105/26.05 |

(Continued)

FOREIGN PATENT DOCUMENTS

| WO | 2008089571 A1 | 7/2008 |
| WO | 2009077184 A1 | 6/2009 |

(Continued)

*Primary Examiner* — Tyler J Lee
(74) *Attorney, Agent, or Firm* — The Webb Law Firm

(57) ABSTRACT

The invention relates to an arrangement for supplying a rail vehicle with electrical energy. One electrical machine is allocated to each of at least two internal combustion engines for generating electrical energy. A common controller is designed to start the internal combustion engines individually as required. At least one pre-heating device is designed to pre-heat the internal combustion engines before a start. A temperature detection device is thermally coupled to the internal combustion engines. The controller is designed, during an operation of one of the internal combustion engines, to start another of the internal combustion engines if, due to cooling of the other internal combustion engine, a temperature of the other internal combustion engine detected by a temperature identifying device reaches or exceeds a temperature threshold.

8 Claims, 4 Drawing Sheets

(51) Int. Cl.
| | |
|---|---|
| *B61C 5/00* | (2006.01) |
| *B60L 11/02* | (2006.01) |
| *F02D 25/00* | (2006.01) |
| *B61C 5/02* | (2006.01) |
| *B60L 1/00* | (2006.01) |
| *B60L 1/02* | (2006.01) |
| *B60L 1/14* | (2006.01) |
| *B60L 3/00* | (2006.01) |
| *B60L 3/12* | (2006.01) |
| *B60L 11/08* | (2006.01) |
| *B60L 11/12* | (2006.01) |
| *B60L 15/20* | (2006.01) |
| *B60K 6/46* | (2007.10) |
| *B60W 30/194* | (2012.01) |
| *B60W 20/15* | (2016.01) |
| *B60K 5/08* | (2006.01) |

(52) U.S. Cl.
CPC ........ *B60L 1/14* (2013.01); *B60L 3/00* (2013.01); *B60L 3/0023* (2013.01); *B60L 3/0061* (2013.01); *B60L 3/0069* (2013.01); *B60L 3/0092* (2013.01); *B60L 3/12* (2013.01); *B60L 11/02* (2013.01); *B60L 11/08* (2013.01); *B60L 11/12* (2013.01); *B60L 15/20* (2013.01); *B60W 20/15* (2016.01); *B60W 30/194* (2013.01); *B61C 5/00* (2013.01); *B61C 5/02* (2013.01); *B61K 9/02* (2013.01); *F02D 25/00* (2013.01); *B60K 5/08* (2013.01); *B60L 2200/26* (2013.01); *B60L 2210/30* (2013.01); *B60L 2210/40* (2013.01); *B60L 2220/14* (2013.01); *B60L 2220/42* (2013.01); *B60L 2240/34* (2013.01); *B60L 2240/36* (2013.01); *B60L 2240/421* (2013.01); *B60L 2240/425* (2013.01); *B60L 2240/429* (2013.01); *B60L 2240/441* (2013.01); *B60L 2240/443* (2013.01); *B60L 2240/445* (2013.01); *B60L 2250/16* (2013.01); *B60L 2260/12* (2013.01); *B60L 2260/16* (2013.01); *B60L 2260/167* (2013.01); *B60L 2260/22* (2013.01); *B60L 2260/26* (2013.01); *B60L 2260/54* (2013.01); *B60L 2260/56* (2013.01); *B60L 2270/12* (2013.01); *B60L 2270/142* (2013.01); *B60L 2270/145* (2013.01); *B60W 2510/0676* (2013.01); *B60Y 2200/30* (2013.01); *B60Y 2200/31* (2013.01); *B60Y 2200/92* (2013.01); *Y02T 10/6217* (2013.01); *Y02T 10/645* (2013.01); *Y02T 10/648* (2013.01); *Y02T 10/7077* (2013.01); *Y02T 10/7241* (2013.01); *Y02T 10/7275* (2013.01)

(58) Field of Classification Search
USPC .................................................. 701/19, 20
See application file for complete search history.

(56) References Cited

U.S. PATENT DOCUMENTS

| | | | |
|---|---|---|---|
| 8,596,201 B2* | 12/2013 | Kral | B61C 5/02 105/62.1 |
| 2010/0106343 A1 | 4/2010 | Donnelly et al. | |
| 2010/0170414 A1 | 7/2010 | Hardin et al. | |
| 2012/0247722 A1 | 10/2012 | Geradts | |
| 2012/0296545 A1* | 11/2012 | Cooper | B61C 17/12 701/99 |
| 2012/0318163 A1 | 12/2012 | Ptacek et al. | |
| 2013/0046424 A1 | 2/2013 | Gallagher et al. | |
| 2013/0152818 A1* | 6/2013 | Holl | B61C 17/04 105/62.1 |
| 2013/0152819 A1 | 6/2013 | Kral | |
| 2013/0333635 A1 | 12/2013 | Geradts et al. | |
| 2014/0094998 A1* | 4/2014 | Cooper | B61L 3/006 701/2 |
| 2015/0013312 A1* | 1/2015 | Gallagher | F02M 25/0818 60/274 |

FOREIGN PATENT DOCUMENTS

| | | |
|---|---|---|
| WO | 2010075326 A2 | 7/2010 |
| WO | 2011072880 A1 | 6/2011 |
| WO | 2012038272 A1 | 3/2012 |
| WO | 2012113711 A2 | 8/2012 |

* cited by examiner

ARRANGEMENT FOR SUPPLYING A RAIL VEHICLE WITH ELECTRICAL ENERGY

CROSS-REFERENCE TO RELATED APPLICATIONS

This application is the United States national phase of International Application No. PCT/EP2014/057613 filed Apr. 15, 2014, and claims priority to German Patent Application No. 10 2013 207 047.0 filed Apr. 18, 2013, the disclosures of which are hereby incorporated in their entirety by reference.

BACKGROUND OF THE INVENTION

Field of the Invention

The invention relates to an arrangement for supplying a rail vehicle with electrical energy wherein the arrangement comprises at least two internal combustion engines to each of which one electrical machine for generating the electrical energy is assigned. The electrical machine is coupled mechanically with the assigned internal combustion engine so that when the electrical machine is in a generator operating mode it is driven by the internal combustion engine. The internal combustion engine and the electrical machine form an internal combustion engine-machine combination. The invention also relates to a method for operating the arrangement and a rail vehicle with the arrangement. Moreover, the invention relates to a method for manufacturing the arrangement and the rail vehicle.

The arrangement serves, more particularly, for supplying electrical traction motors in a rail vehicle with electrical energy and optionally also for supplying additional electrical auxiliary devices for the operation of the rail vehicle with electrical energy. The rail vehicle is, for example, a locomotive. The invention is not limited to that, however. In fact, the rail vehicle can, for example, also be a train unit.

Auxiliary devices as used herein are understood to mean devices which, though not producing traction directly may, more particularly, be necessarily required for the operation of the rail vehicle. Auxiliary devices can broadly be defined that they are supplied with electrical energy from the customarily available direct-current (DC) link by an own auxiliary device inverter or a plurality of own auxiliary device inverters. Examples of auxiliary devices are, e.g., fans and other cooling devices which cool the internal combustion engines, the traction motors and/or other devices (e.g., power converters) required for the operation of the rail vehicle. Moreover, also required for the operation of the rail vehicle is a brake assembly, and therefore components of the brake assembly such as air compressor also belong to the auxiliary devices. More examples of auxiliary devices are a fire extinguishing device of the rail vehicle, electronic devices for controlling the operation of the rail vehicle, battery charging devices, for the operation of the rail vehicle at least temporarily required heaters, e.g., windshield defroster heating, and/or lighting device in the driver's compartment. Optionally, differentiated from the auxiliary devices can be electrical devices provided merely for the comfort of passengers such as, for example, lamps in the compartments of the vehicle. In trains, such electrical devices are customarily supplied with electrical energy via the so called train bus bar.

The train bus bar is not connected with the DC link by the auxiliary device inverter or one of the auxiliary device inverters but by an inverter of its own.

It is prior art that the electrical energy generated by the electrical machines is fed into a DC link via at least one rectifier (hereinafter referred to as generator rectifier because the alternating current produced by the generator is rectified). Connected to the DC link are typically several inverters which, in turn, generate the alternating current on the required electrical voltage level or in the required electrical voltage range that is needed for the consumers and systems connected on the alternating voltage side. In addition to the inverters, provided on the latter's direct voltage side can be direct voltage converters and/or transformers on their alternating voltage side, for changing the voltage level. Other electrical converters can also be connected to the DC link, either directly or indirectly. Moreover, except the auxiliary devices named, other electrical consumers such as, e.g., electrical devices provided for the comfort of passengers such as light, air-conditioning and information systems, can also be supplied with electrical energy from the DC link, e.g., via an inverter other than the auxiliary devices required for the operation of the rail vehicle.

For example, connected to the DC link are: a plurality of traction motors of the rail vehicle via one or several traction inverters; a train power bus via an additional converter or directly; auxiliary devices required for the operation of the rail vehicle via an auxiliary device inverter. Besides, additional converters can be connected to the DC link, e.g., for the purpose of converting into heat excess energy fed into the DC link during the braking of the rail vehicle. An example of such an arrangement is characterized in WO 2009/077184 A1.

The invention relates to the case in which more than one internal combustion engine is provided and in each case at least one electrical machine is coupled to the internal combustion engine. It is therefore possible that only a part of the electrical machines provided generates electrical energy whereas, at the same time, another part of the electrical machines operates as motor, more particularly, to power the associated internal combustion engine in idle mode. The advantage of that is that the fuel supply of the internal combustion engine can be stopped. Alternately, it is also possible that at least one of the internal combustion engines runs merely at low speed and therefore the associated electrical machine generates or electrical machines generate only a low electrical output which does not or does not significantly contribute to the electrical output that is fed into the DC link.

Basically, a difference is to be made between the following operating states of an internal combustion engine:

The moving parts of the internal combustion engine do not move. This state is referred to as turned-off state. In that state, no fuel is injected into the combustion spaces of the engine.

The moving parts of the internal combustion engine move by the power of the electrical machine that is coupled to the engine. In that state also, no fuel is injected into the combustion spaces of the engine. That state is referred to as deceleration fuel cut-off.

The internal combustion engine produces mechanical power. Consequently, the electrical machine coupled to the engine is driven and generates electrical energy. In that state, fuel is injected into the combustion spaces to produce mechanical power.

More particularly, the invention relates to the case in which temporarily at least one of the internal combustion engines is turned off.

A plurality of internal combustion engine-machine combinations offers advantages in the part-load operation mode of the rail vehicle, i.e., in an operation in which not the maximum possible electrical power is needed. In part-load operation mode, the mechanical power of merely a part of the internal combustion engine suffices to provide the required electrical power. In addition to a reduction of the fuel consumption of the internal combustion engine, the noise pollution of the environment in the part load operation mode is also lower. For example, four internal combustion engine-machine combinations can be provided, in which preferably each combination can be operated independently of the other combinations either in idle mode or at the optimal power point. Optionally more than two operating modes can be set for each combination, e.g., in addition to the two operating modes mentioned, an operating mode with medium power of the electrical machine operating as generator.

More particularly, for the other possible features of an arrangement with several internal combustion engine-machine combinations, reference is made here to the international patent application number PCT/EP 2012/052705 filed on Feb. 16, 2012. More particularly, the entire content of that application is hereby included by reference.

Description of Related Art

It is prior art to pre-heat the internal combustion engines before they are started. More particularly, in practice, cooling liquid is provided by a cooling circulation system for cooling the internal combustion engine wherein the cooling liquid is preheated if necessary. The energy required for preheating can be obtained particularly from converting electrical energy into heat, by exothermal chemical processes (more particularly, the combustion of fossil fuel) and/or by the release of stored thermal energy (optionally by discharging a latent heat accumulator).

Disclosed in WO 2008/089571 A1 is a method for controlling a required total output power of a vehicle that comprises a plurality of energy sources. These energy sources provide electrical power to a common DC link. A number of energy sources to be used is selected, and that according to a scheme to supply power to the DC link. The energy sources are activated according to the scheme. If the power output of one of the energy sources is different from a target power output, control parameters of the energy source are adapted to correct the difference. In the concrete embodiment of FIG. 17 of the said publication, it is determined at first whether a warm internal combustion engine is available. In any case, in selecting the internal combustion, it is considered which internal combustion engine had been used more often than others in the past so that the use is balanced more or less. Besides, the selection can be at random or in a regular cycle. When no warm internal combustion engine is available, the selected internal combustion engine is preheated.

SUMMARY OF THE INVENTION

It is an object of this invention to increase the availability of the internal combustion engines in an arrangement for supplying a rail vehicle with electrical energy and thereby reduce the energy consumption.

The internal combustion engines can be preheated before a start, particularly in the manner described above. However, a basic idea of this invention is to avoid preheating of the internal combustion engines if possible. Therefore, when selecting the internal combustion engine for producing electrical energy, the start of an internal combustion engine is preferred, at least if otherwise a cooling down of the internal combustion engine below a minimum temperature specified for the start occurs. A preference of the start of such an internal combustion engine takes place particularly in comparison with a scheme according to which the internal combustion engines are selected for the generation of electrical energy without consideration of the cooling down.

The temperature of the internal combustion engine which should have or exceed a predefined minimum level for a start of the internal combustion engine is, more particularly, a cooling liquid temperature in a cooling circuit for cooling the internal combustion engine.

More particularly in the aforementioned part load operation mode, it can happen that one or several of the internal combustion engines are turned off. In contrast with this, the operation in the also aforementioned case in which the internal combustion engine is driven by the electrical machine is referred to as deceleration fuel cut-off. A cooling down of the internal combustion engine below the minimum temperature predefined for a start can particularly take place during a stop of the rail vehicle (e.g., a stop at a railroad station or a train stop).

When an internal combustion engine threatened with cooling down is started that would not have been started according to a control scheme without the threat of cooling down, the generation of the electrical output can be split among internal combustion engines operating already before the start of the internal combustion engine threatened with cooling down (this can also be a single internal combustion engine) and additionally the newly started internal combustion engine. However, it is also possible to turn off at least one operating internal combustion engine after the start of the internal combustion engine threatened with cooling down. However, a newly started internal combustion engine will at first be supplied with fuel for a time after the start and generate mechanical energy by combusting the fuel before it is optionally driven in idle mode by the associated electrical machine.

By starting an internal combustion engine threatened with cooling down energy for preheating the internal combustion engine is saved. This is based on the idea that at least during the normal operation of the rail vehicle all internal combustion engines must be available for the generation of electrical energy. Moreover, in many arrangements for generating electrical energy for rail vehicles preheating devices for several internal combustion engines are coupled with each other. Depending on the type, it may be inadmissible to use the common preheating system also for preheating only one of the internal combustion engines while another internal combustion engine is operating. Although, when in such a preheating system none of the internal combustion engines is in operation, one of the internal combustion engines or several of the internal combustion engines could be preheated when needed. During that time, however, the operation of all internal combustion engines sharing a preheating system would not be admissible. In case of shared preheating systems and the said limitations of operation, therefore, the solution according to the invention increases the availability of the internal combustion engines.

For example, the liquid cooling circuits of at least two internal combustion engines can be connected with each other or become connected with each other by opening appropriate liquid valves. A heating device for heating the cooling liquid is provided. As the cooling circuits are connected with each other, this heating device can be used for preheating all internal combustion engines the liquid cooling circuits of which are connected with each other.

More particularly, a control of the arrangement can determine how many of the internal combustion engines should be operated during the operation period of the rail vehicle. In selecting the internal combustion engine for operation it is then considered according to the invention whether one or several of the internal combustion engines is threatened with cooling down.

As aforesaid, a scheme can be defined that with consideration of the present operating state of the arrangement with several internal combustion engines, with consideration of the present demand on the arrangement and optionally also of future demands on the arrangement and, further optionally, with consideration of additional parameters of the arrangement (such as, e.g., faults of an internal combustion engine) selects the internal combustion engine that should at that moment be used for generating electrical energy. However, according to the invention, when the preconditions for starting an internal combustion engine threatened with cooling down exist, the selection that would be made in accordance with the scheme will be changed in that the internal combustion engine that is threatened with cooling down is started.

When operating the arrangement with several internal combustion engines, a prioritization of internal combustion engines according to the following two procedures can be made, which optionally can also be combined. At first, the prioritization can only relate to the sequence of starts or stops of the internal combustion engines and optionally also allow the change of operation of one or several internal combustion engines by stopping at least one internal combustion engine and starting at least one other internal combustion engine. The prioritization in that case influences the start and stop of the engines, more particularly, the starting time and stopping time, respectively. According to this procedure, engines with higher prioritization start earlier and/or stop later. The number of operating hours of the engines with higher prioritization therefore increases more than that of the engines with lower prioritization. The average utilization of the engines with higher prioritization drops because the proportion of times with idle running of the engine increases.

Secondly, the prioritization can have an effect on the apportionment of the required mechanical power of the internal combustion engines. Engines with higher prioritization then generate more power in part-load operating mode than engines with lower prioritization. Consequently, the power is apportioned unequally.

More particularly, following the scheme, a so-called static prioritization of the selection of the internal combustion engines for operation can take place, i.e., a prioritization according to long-term, slowly changing criteria and preferably also a dynamic prioritization in the selection by short-term criteria which are weighted higher than the criteria of the static prioritization. One of several possible criteria of the dynamic prioritization according to the invention can be the start of an internal combustion engine threatened with cooling down. Other criteria of the dynamic prioritization are, e.g., known limitations of the availability of one or several of the internal combustion engines, e.g., with a known fault, and/or an excess loading of a particle filter in the exhaust line of one or several of the internal combustion engines. Such particle filters are known particularly in diesel engines. The particle filter load increases more and more with a low exhaust temperature. When the exhaust temperature increases, which is attained particularly by a higher load (i.e., by higher mechanical power) of the internal combustion engine, the load of the particle filter can be reduced again in known manner.

The criteria of the dynamic prioritization, which should be rated higher than the criteria of static prioritization are, in general words, particularly criteria that when ignored the components of the rail vehicle and especially the arrangement with the internal combustion engines and/or the operation of the rail vehicle can be jeopardized.

One criterion of the static prioritization is, e.g., the operation of the different internal combustion engines performed in broadly the same manner for extended periods of time. In particular, the operation hours, the fuel consumption, the number of revolutions of the moving parts of the internal combustion engine completed and/or the mechanical energy produced can be considered. Alternately or additionally, the selection of the engines that shall operate can be made randomly, in accordance with a stochastic distribution and/or according to the rotation principle. One further criterion of the static prioritization is, e.g., the number of start procedures of the different internal combustion engines, in which these numbers should be of the same magnitude over long periods of time.

In determining the number of internal combustion engines that should be running at the same time, certain operating specifications, in particular, such as, e.g., the ability of quick response to changes of output when running in hilly terrain or comparatively slow response when running in flat terrain can be considered. Optionally, the train driver can specify or influence that number. The train driver can also influence the scheme of selection or he can even specify directly which internal combustion engine will be started next and/or the power of which internal combustion engine will be increased or reduced. Even the stopping of an internal combustion engine can optionally be determined by the vehicle driver directly.

In any case (not only in the case of an additional dynamic prioritization), a sequence of the start of the internal combustion engines can be determined particularly according to the aforementioned criteria of the static prioritization. Particularly when the generated electrical power must be increased, e.g., when a correspondingly higher demand is made, the internal combustion engine that is first in the sequence can be started. Alternately or additionally, it follows from the scheme whether, in part load operation, at first the power of an internal combustion engine that is already running is increased and/or whether at least one additional internal combustion engine is started.

According to the invention, the sequence for the start of the internal combustion engine set by the scheme or obtained according to the selection scheme can be changed. For example, an internal combustion engine that, according to the sequence, should be started next is not started and an internal combustion engine threatened with cooling down is started instead. In particular, a rearrangement of the sequence of the internal combustion engines to be started can be made. The start of an internal combustion engine threatened with cooling down need not necessarily take place immediately.

Preferably, in static prioritization, the number of operating hours and, in addition, also the fuel consumption are, on a long-term basis, spread equally among the available (more particularly among the faultlessly working) internal combustion engines. However, the static prioritization resulting from it is preferably changed by the dynamic prioritization. This means, in particular, that an engine is not operated despite higher static prioritization if this is determined by the dynamic prioritization. Cause for the change of the static prioritization by the dynamic prioritization is, for example, a fault of the engine (possibly because of high temperatures, insufficient volumes, particularly levels of operating media, or excess speeds).

In the case of the static and more particularly also the dynamic prioritization, the total number of the starting procedures taking place is increased. Because every starting procedure also consumes energy and results in wear of the involved components, the prioritization is preferably designed, by additional criteria, in such a way that the number of starts is increased as little as possible. Such additional criteria are, e.g., the temperature of the internal combustion engines, a hysteresis during the execution of starts and stops (i.e., an internal combustion engine threatened with cooling down that is started must obtain a predefined minimum temperature before it may again be turned off) and/or a delay in the execution of a stop of an internal combustion engine started a short time before (i.e., the stop determined by the scheme is not yet executed and may not be executed in the long term when the requirements change).

Preferably, internal combustion engines turned off are cooled down only as far as necessary. In particular, it is common practice, in addition to the aforementioned cooling of the internal combustion engines by liquid, also to cool the space in which the respective internal combustion engine is disposed and in which also the electrical machine combined with it is disposed by producing a flow of cooling air through that space. Fans are used for that purpose. Preferably every space in which an internal combustion engine-machine combination is disposed is combined with at least one fan in each case. And yet it is not excluded that the spaces in which the different internal combustion engine-machine combinations are disposed are interconnected so that an air exchange can take place among the different spaces. However, the fan assigned to a particular combination generates a cooling air flow predominantly or exclusively through the space of the internal combustion engine-machine combination to which it is assigned.

Now the invention contemplates that at least one fan that is assigned to an internal combustion engine-machine combination should be operated depending on whether the assigned internal combustion engine is running or at standstill. More particularly, the fan will only operate when a temperature of the internal combustion engine-machine combination exceeds a defined limit and when the assigned internal combustion engine is running (i.e., the movable parts of the engine are moving), i.e., it generates a cooling air flow through the space in which the associated internal combustion engine-machine combination is located. In the following, the fan or the fans assigned to an internal combustion engine-machine combination will be referred to as ventilation unit. The different ventilation units of the engine-machine combinations together form a ventilation device. The said temperature limit will, in the following, also be referred to as second predefined temperature limit, to distinguish it from a first predefined temperature limit that can be used for defining whether an internal combustion engine has cooled down sufficiently to be started again.

Operating the ventilation units in dependence on the operation of the associated internal combustion engine and in dependence on the temperature has the advantage that the internal combustion engines cool down at a slower rate and therefore the start of an internal combustion engine threatened with cooling down is delayed. This reduces the energy required for the starting procedures of the internal combustion engines and also reduces the wear of the internal combustion engines and also of the electrical machines. More particularly, the ventilation unit associated with an engine-machine combination can remain turned off (for example, the fan or the fans of the ventilation unit remain turned off) until a temperature limit of the internal combustion engine temperature (in the characterization of an embodiment in the following also referred to as third temperature limit) is attained or exceeded. The temperature limit, in particular, is higher than the first predefined temperature limit, at which the turned off internal combustion engine is started again if the threshold is not met.

More particularly, the invention contemplates: An arrangement for supplying a rail vehicle with electrical energy, wherein the arrangement comprises:
- at least two internal combustion engines,
- for the at least two internal combustion engines an associated electrical machine each for generating the electrical energy, wherein the electrical machine is coupled mechanically with the internal combustion engine so as to be driven by the internal combustion engine when the electrical machine is in generator operating mode so that at least one first and one second internal combustion engine-machine combination are formed,
- a common control of the internal combustion engine-machine combinations, wherein the control is designed to start the internal combustion engines individually as required,
- at least one preheating device designed to preheat the internal combustion engines before a start,
- a temperature determining device coupled thermally with the internal combustion engines and connected to the control by a signal link to transfer information about the temperatures of the internal combustion engines to the control, whereas the control is designed, while one of the internal combustion engines is running, to start another one of the internal combustion engines when, by reason of a cooling down of the other internal combustion engine, a temperature of the other internal combustion engine determined by the temperature determining device reaches or drops below a first predefined temperature limit.

The invention also relates to a rail vehicle comprising the arrangement according to one of the embodiments disclosed in this specification and the figures.

Provided according to one method of making the arrangement or the rail vehicle with the arrangement of the rail vehicles are:
- at least two internal combustion engines,
- for the at least two internal combustion engines an associated electrical machine each for generating the electrical energy, wherein the electrical machine is coupled mechanically with the internal combustion engine so as to be driven by the internal combustion engine when the electrical machine is in generator operating mode so that at least one first and one second internal combustion engine-machine combination are formed
- a common control of the internal combustion engine-machine combinations, wherein the control is designed to start the internal combustion engines individually as required
- at least one preheating device designed to preheat the internal combustion engines before a start,
- a temperature determining device coupled thermally with the internal combustion engines and connected to the control by a signal link to transfer information about the temperatures of the internal combustion engines to the control, whereas the control designed, while one of the internal combustion engines is running, to start another one of the internal combustion engines when, by reason of a cooling down of the other internal combustion engine, a temperature of the other internal combustion engine determined by the temperature determining device reaches or drops below a first predefined temperature limit.

In addition to controlling the internal combustion engine-machine combinations, the control can perform other functions as well. In particular, the control can be part of a higher-level control of the rail vehicle which also controls the traction motors of the rail vehicle and/or power converters that generate electricity particularly for the operation of the traction motors, the auxiliary devices and/or other electrical consumers in the rail vehicle. These power converters are, in particular, connected to a common DC link into which the electrical machines feed electrical energy via a rectifier.

The temperature determining device comprises, in particular, for each of the internal combustion engine-machine combinations, at least one temperature sensor that measures the temperature of the combination. More particularly, the temperature sensor can measure a cooling fluid temperature of the cooling fluid used for cooling the internal combustion engines. The temperature sensor is, in this case, disposed in a cooling liquid circuit, e.g., in a section of the cooling liquid circuit that is in direct contact with the internal combustion engine.

The phrase "attains or drops below a predefined temperature limit" refers to two different cases. In the first case, the condition for starting the other internal combustion engine, i.e., the internal combustion engine threatened with cooling down, is met when as a consequence of the cooling down the predefined temperature limit is attained, i.e., the temperature determined is equal to the temperature limit. In the other case, the condition is met when the temperature determined is lower than the predefined temperature limit, i.e., becomes smaller than the temperature limit.

The invention further comprises: A method for operating an arrangement for supplying a rail vehicle with electrical energy, wherein:
- as required, at least two internal combustion engines of the arrangement operate simultaneously,
- used for the generation of the electrical energy is an electrical machine each which is coupled mechanically with the internal combustion engine so that in generator operating mode of the electrical machine is driven by the internal combustion engine and so that at least one first and one second internal combustion engine-machine combination are formed,
- the internal combustion engines are optionally preheated before the start,
- information about the temperature of the internal combustion engine measured is transferred to a control of the arrangement, wherein the control while one of the internal combustion machines is running starts one other of the internal combustion engines when, by reason of a cooling down of the other internal combustion engine, a temperature of the other internal combustion engine determined by the temperature determining device reaches or drops below a first predefined temperature limit.

More particularly, the control can start the other internal combustion engine when a predetermined temperature limit is attained or is not met although an engine power of the internal combustion engine or the internal combustion engines already in operation is sufficient for supplying the rail vehicle with electrical energy.

In particular, the control or a higher-level control can determine the required engine power. In part load mode, when not the maximum possible power of the arrangement is demanded, the situation can arise that at least one of the internal combustion engines of the arrangement can be turned off. Now when an internal combustion engine that is turned off is threatened with cooling down which, in particular, is determined by determining one of the above conditions by a comparison of the temperature measured with the predefined temperature limit, the internal combustion engine threatened with cooling down is started even though this is not necessary for generating the required engine power. This can also be the case when the required engine power remains the same or even drops when the said condition occurs.

Alternately or additionally, the control can reduce the engine power of the internal combustion engine already in operation or of the internal combustion engines already in operation as soon as the other internal combustion engine is started and contributes to a total engine power of all internal combustion engines already in operation.

In this way it is not necessary to stop an internal combustion engine that is already in operation, i.e., take it out of operation, when the internal combustion engine that is threatened with cooling down is started. This is of advantage particularly if too many starts and stops of the internal combustion engine are to be avoided.

As already stated above, the arrangement can comprise a ventilation device for ventilating and therefore for cooling the engine-machine combinations. Assigned to each of the engin-machine combinations is one of several ventilation units of the ventilation device so that the ventilation units, when they are running, cool mainly or exclusively the engine-machine combination assigned to each. In particular, each of the engine-machine combinations is combined with at least one temperature sensor and, despite the operation of the rail vehicle, the ventilation units are/will in each case be turned off when the internal combustion engine of the engine-machine combination assigned to it is not in operation or when a temperature measuring value of the temperature sensor or of the temperature measuring sensors of the engine-machine combination assigned to it meets a temperature criterion, that is, when it is either smaller than the second predefined temperature limit or is smaller than or equal to the second predefined temperature limit.

In addition, preferably a third temperature limit is predefined that is higher than the second predefined temperature limit. For example, the second temperature limit is at 30° C. and the third temperature limit is at 50° C. If the temperature measuring value of the temperature sensor or the temperature sensors of the assigned engine-machine combination is higher than the third predefined temperature limit or if—in another case—the temperature measuring value is larger than or equal to the third predefined temperature limit, the associated ventilation unit is/will be turned on irrespective of whether the internal combustion engine of the combination is in operation or out of operation. This can counteract an overheating of components of the engine-machine combination in any case, also when external effects and/or other internal combustion engines have caused heating.

When the temperature measuring value is higher than the second predefined temperature limit (e.g., 30° C.) and the assigned internal combustion engine is in operation, the associated ventilation unit is also operating. In this way, overheating is also prevented. However, only the ventilation units that are required will operate. In particular, this minimizes the generation of noise. The generation of noise is of significance particularly when the rail vehicle is at standstill in stations or at stops. In contrast with an operation of an internal combustion engine, which is only said to occur when the movable parts of the internal combustion engine are moving, a rail vehicle is said to be in operation also when it is standing still (e.g., during a stop at a station), but at least one of the internal combustion engines operating. So when the rail vehicle is standing still, the maximum number of ventilation units operating concurrently can be limited to a value that is smaller than the number of the available ventilation units. This is based upon the conception that at standstill of the rail vehicle the maximum possible total power of the internal combustion engines will never be required. Moreover, the rail vehicle often stands still when it is in a station or at a stop. So the emission of noise should be minimized.

For example, with maximum four engine-machine combinations, the maximum number of the ventilation units operating when the rail vehicle is at standstill is set to two. This means that even when more than one internal combustion engine and more particularly also more than two internal combustion engines operate when the rail vehicle is at standstill, merely two ventilation units operate. The selection of the ventilation units that should operate can be made on the basis of different criteria, particularly the generation of noise, the temperature in the engine room and the temperature difference between the different internal combustion engines in the machine room. If two engine-machine combinations each are located on either side of the rail vehicle (that is on the right and left side seen in the direction of travel), it can be determined that maximum one ventilation unit should be in operation on each side when the rail vehicle is at standstill. This reduces the generation of noise even further. Alternately or additionally, the noise generation of the different ventilation units can be controlled in that their ventilation power is set. More particularly, this can be attained by setting (particularly by reducing) the alternating current frequency of the electrical alternating current with which the ventilation unit is supplied.

Components of the engine-machine combination which should particularly be protected from excessive temperatures include the coupling in the powertrain between internal combustion engine and electrical machine, the electrical contactors of the electrical machine for the electrical connection of the machine to the electrical system of the rail vehicle and particularly to the DC link as well as the mechanical vibration dampers of the internal combustion engines.

The following preferred procedure serves the protection particularly of these and other components of the combinations. In a first step, when a fourth predefined temperature limit (e.g., 60° C.) is attained, the alternating current frequency of the current supplying the fans is increased to the maximum value (e.g., 60 Hz) by the temperature measuring value. When the ventilation unit operates below the fourth predefined temperature limit, the frequency of the alternating current is smaller and is either constantly at its minimum value (e.g., 45 Hz) or, as the temperature rises, is raised constantly or in steps until the maximum value of the frequency is attained when the fourth predefined temperature limit is attained. The said alternating current frequency is attained particularly by the appropriate control of an auxiliary device converter that is connected to the DC link into which the electrical machines feed electrical energy.

As another protective measure, a fifth temperature limit can be/is predetermined. When the temperature measuring value attains the fifth predefined temperature limit, the power of the associated internal combustion engine can be reduced, particularly by reducing the speed of the internal combustion engine to idling speed.

In preferred embodiment, at least one of the ventilation units is and preferably all ventilation units are provided with a fan protection switch each. Besides, the function of that protection switch can be monitored, e.g., by additional electrical contacts of the protection switch. The fan protection switch turns off the fan or the fans when the electrical motor of the fan is overloaded, e.g., due to a short circuit in the winding.

Preferably the power of the ventilation units and optionally even of all other ventilation units in operation is increased and particularly increased to the maximum possible fan power when the monitoring of the fan protection switch detects that the fan protection switch is no longer in working order. The same measure can be taken alternately or additionally when the temperature sensor of the engine-machine combination is defective or the appropriate temperature measuring value cannot be determined for other reasons (e.g., in case of a defect of the device for analyzing the temperature measuring value). More particularly, the maximum fan power is set again by raising the frequency of the electrical supply current to its maximum value.

BRIEF DESCRIPTION OF THE DRAWINGS

Embodiments of the invention will now be described with reference to the attached drawings. The different figures in the drawings represent schematically.

DETAILED DESCRIPTION OF THE INVENTION

Figure 1:
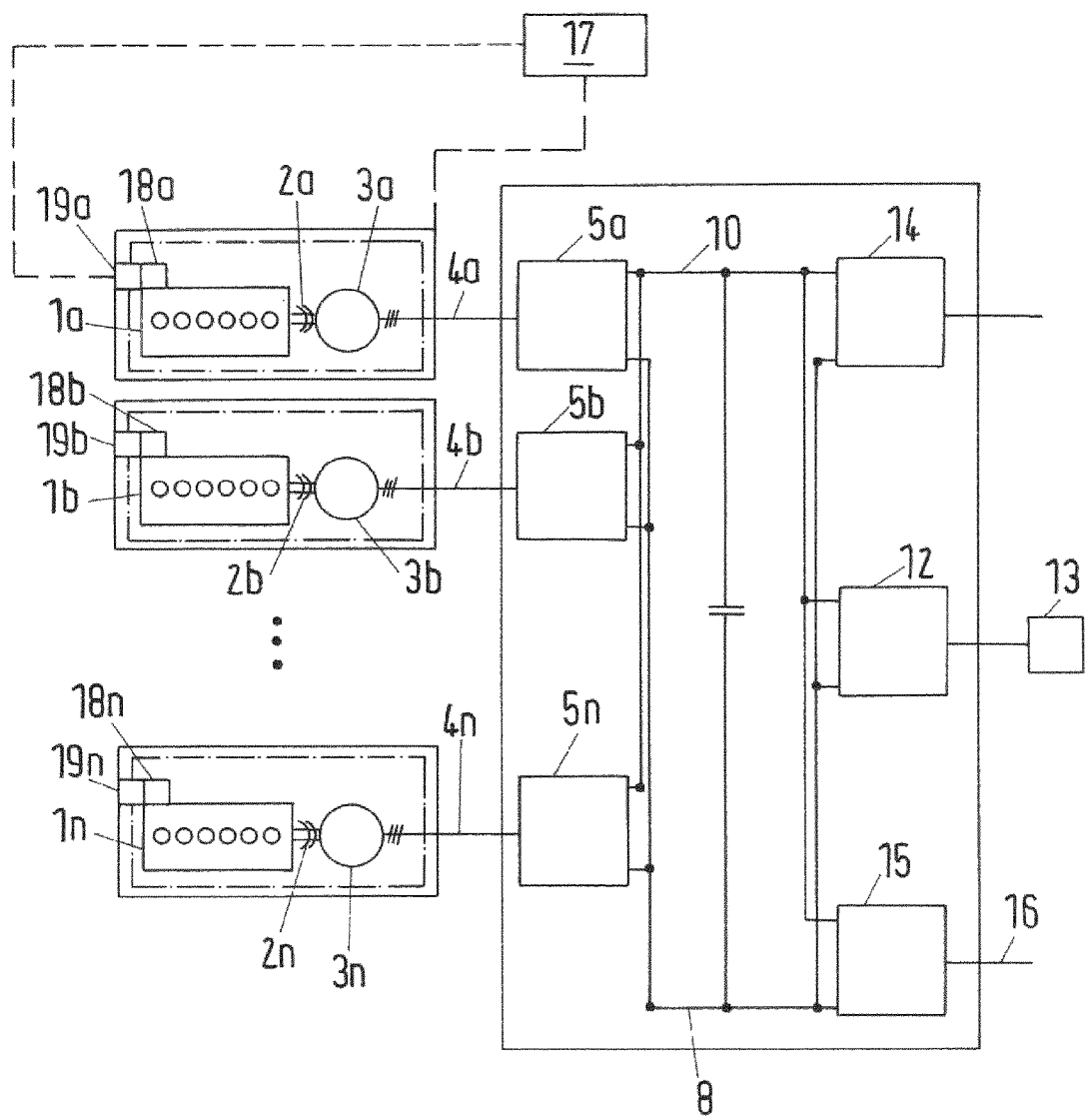
FIG. 1 one embodiment of an arrangement for supplying at least one traction motor and additional electrical auxiliary devices in a rail vehicle with electrical energy, FIG. 2 a control system in a rail vehicle, FIG. 3 a top view of an engine space with three engine-machine combinations associated to each of which is one ventilation unit, and FIG. 4 a flow chart illustrating the sequence of the control of the operation of a plurality of internal combustion engine-machine combinations.

The embodiment shown in FIG. 1 comprises a plurality of internal combustion engine-machine combinations 1, 3, wherein the internal combustion engines 1a, 1b, . . . 1n are preferably diesel engines. The electrical machines 3a, 3b, . . . 3n are, e.g., permanent magnet synchronous motors. Shown are three specimens each of the component, with the three dots between the combinations 1b, 3b and 1n, 3n indicating that still other specimens can exist. Each of the internal combustion engines 1 is coupled, by a drive shaft with coupling 2a, 2b, 2n, to the associated electrical machine 3.

Each of the combinations 1, 3 is connected, by a three-phase connection line 4a, 4b, 4n, to a generator rectifier 5a, 5b, 5n assigned to the combination 1, 3. The rectifiers 5 are connected with a DC link by lines 8, 10.

Each of the engines 1 is combined with a cooling circuit 18a, 18b, . . . , 18n in which cooling liquid circulates and cools the engine 1 when the cooling circuit 18 is in operation. Each cooling circuit 18 is combined with at least one temperature sensor 19a, 19b, . . . 19n which measures the temperature of the cooling liquid. As shown by the dashed line on top in FIG. 1 only for the temperature sensor 19a, the temperature sensors 19 are connected, by a signal link, with the control 17 which controls the operation of the combinations 1, 3. The dashed line from the control 17 to the combination 1a, 3a shown on top in FIG. 1 indicates that the control can control the operation of each of the combinations 1, 3, more particularly it can start and stop the respective internal combustion engine 1.

Figure 3:
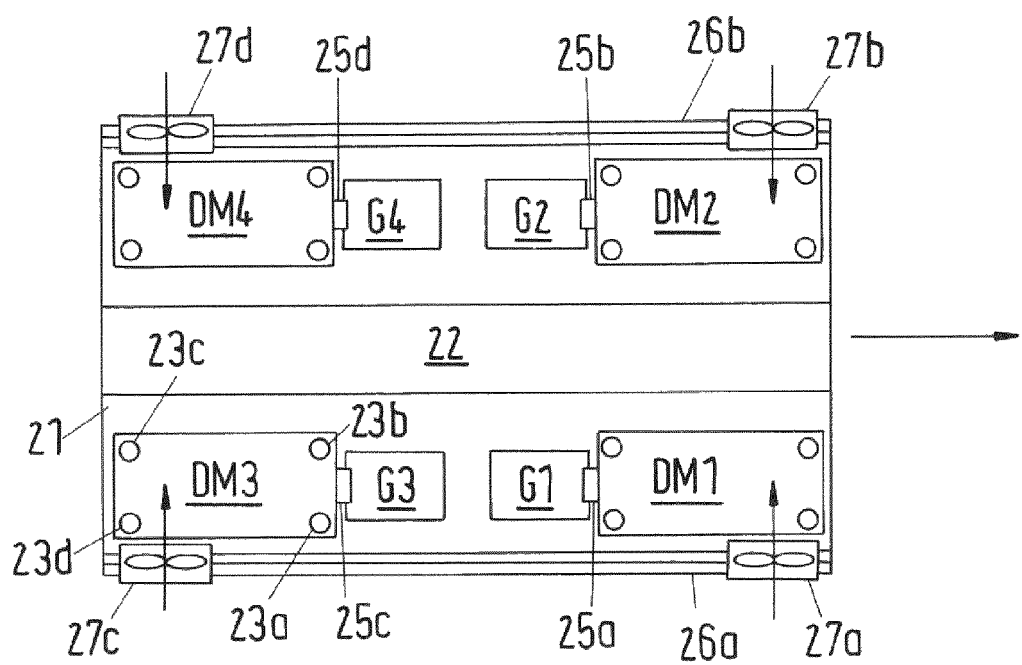

The two conductors of an auxiliary devices inverter 12 on the direct voltage side are connected to the lines 8, 10 of the DC link. On its alternating voltage side, the auxiliary devices inverter 12 is connected electrically to a ventilation unit 13 for ventilating and thereby cooling the internal combustion engine-machine combinations 1, 3, where the ventilation units 13 are represented schematically by a square. FIG. 3 illustrates a concrete embodiment in which four ventilation units are shown.

Also connected to the DC link are a traction motor inverter 14 and a bus bar inverter 15. During the operation of the rail vehicle the traction motor inverter 14 supplies at least one traction motor with alternating current and therefore with electrical energy. The bus bar inverter 15 supplies, via a train bus bar 16, electrical consumers such as, for example, the air-conditioning system, heaters, lighting system. In addition to the ventilation units 13, the auxiliary devices inverter 12 or another auxiliary devices inverter not seen can supply other auxiliary devices with electrical energy from the DC link.

When the electrical consumers connected to the DC link do not need the maximum possible electrical power which the internal combustion engines 1 can generate through their electrical machines 3, individual combinations 1, 3 can be turned off because of the plurality of the internal combustion engine-machine combinations 1, 3, i.e., the internal combustion engine of the combination is out of operation. Alternately such a combination can operate at idle speed of the internal combustion engine. The decision of turning off the internal combustion engine or an idle mode can be made by an automatic control, e.g., a driver assist system. Alternately, the driver, i.e., the train operator, himself can make or influence the decision.

The number of combinations 1, 3 to which the generation of electrical energy is split can be made particularly depending on the momentary power demand or the requested power requirement. In particular, the power demand and the requested power requirement can be referenced to predefined power thresholds, for which information for the operation of the engine-machine combinations is stored.

Figure 2:
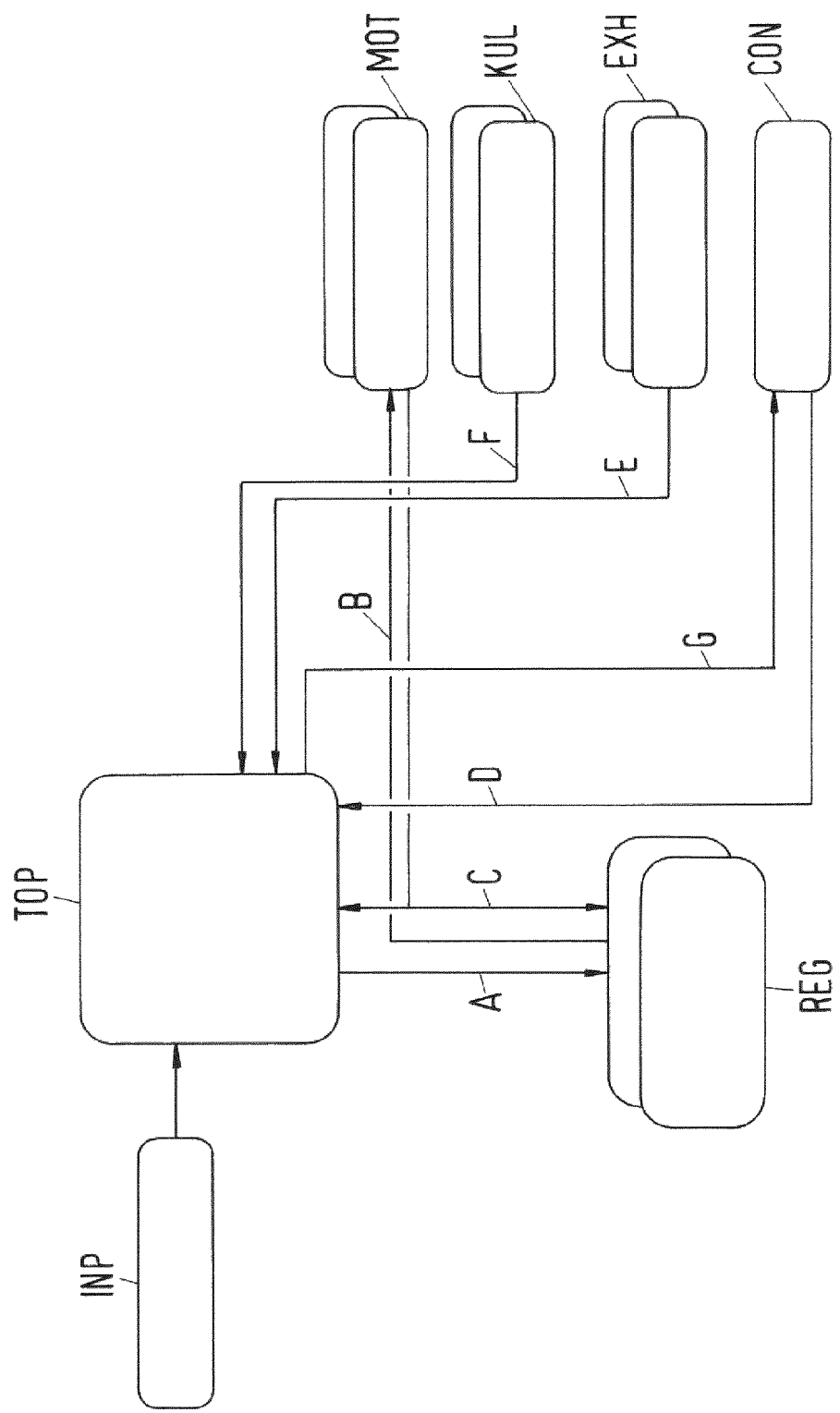

Illustrated in FIG. 2 are entries which, e.g., the driver or the driver assist system provide for the operation of a control represented by the INP block in FIG. 2. They are sent to a higher-level vehicle control TOP. The higher-level vehicle control TOP has, in particular, the function of preparing operating values, e.g., the power balance sheet of the controlled engine-machine combinations and setting priorities for the selection of the internal combustion engines of the arrangement for operation.

As indicated by arrow A, the higher-level vehicle control TOP controls the operation of a lower-level engine-machine control or regulation REG. The purpose of this lower-level control REG is to control the start and stop of the different internal combustion engines of the arrangement MOT (as indicated by arrow B) while, in particular, paying attention to a balanced load or balanced operation of the internal combustion engines over longer periods of time. The combination of the controls TOP, REG is an embodiment of the control 17 illustrated in FIG. 1. As indicated by double arrow C, the higher-level control TOP and the lower-level control REG exchange information between each other during operation. For example, the lower-level control REG transfers information about the balanced or unbalanced utilization of the different internal combustion engines to the higher-level control TOP. Corresponding information is, e.g., process variables such as speeds, temperatures, electrical currents, but also fault messages. The higher-level control TOP transfers to the lower-level control REG particularly for each of the internal combustion engines a power setpoint and/or the specification which internal combustion engines shall operate (arrow A). Except the start and stop instructions, the lower-level control REG also transfers to the engine-machine combinations power and/or speed setpoints.

The electrical consumers that supply particularly the traction motors, the auxiliary devices and the consumers supplied via the train bus bar are illustrated schematically by the block CON in FIG. 2. Control instructions and other specifications can be sent by the higher-level control TOP to the consumers (arrow G), e.g., traction forces for the traction system and braking forces for the brake system. Reversely, the consumers CON can send information about their operation (e.g., actual electrical powers or forces) as well as fault messages to the higher-level control TOP (arrow D).

The designation EXH illustrates the exhaust system of the internal combustion engines. This also includes particle filters, particularly in case of diesel engines. The particle filters transfer information about their load with particles to the higher-level control TOP (arrow E).

The cooling device KUL for cooling the internal combustion engines and the engine-machine combinations, respectively transfers to the higher-level control TOP information about their operation such as, e.g., temperatures and fault messages (arrow F). The cooling device KUL is combined with a preheating device which can heat up the cooling liquid in a cooling circuit to preheat the engine before starting it.

The time at which internal combustion engines are started or stopped during part load operating mode depends particularly on the present and future total power demand. If the future total power demand is not known as is the case, for example, with an available stored load profile or in the case of an appropriately designed driver assist system, it is possible, in particular, that the vehicle driver provides information about the future power demand to the control system. For example, the vehicle driver can, in this way, communicate a forecast of the future total power demand to the system. The vehicle driver can do this, e.g., by selecting a predefined operating mode. Alternately or additionally, the vehicle driver himself can enter the engines to be operated or at least the number of engines to be operated.

In the special embodiment of FIG. 3, four internal combustion engine-machine combinations are disposed together in a machine space 21, which comprises a central aisle 22. The space for the vehicle driver is located, e.g., to the right of the machine space 21, as the arrow on the right in FIG. 3 indicates. The different internal combustion engines, e.g., diesel engines, are designated by reference codes DM1, DM2, DM3 and DM4. Some vibration dampers of the engines DM are identified by small circles with the reference signs 23a to 23d. Each of the engines DM is coupled mechanically, by a drive shaft not shown in detail, to an electrical machine G1, G2, G3, G4. Disposed in the power train between the internal combustion engine DM and the electrical machine G, more particularly in the area of a coupling of the power train, is a temperature sensor each 25a, 25b, 25c, 25d.

The engine-machine combinations are disposed in a common machine space 21, not completely separated into parts so that an air exchange can take place in the machine space 21. Air inlet openings with at least one fan 27a, 27b, 27c, 27d each are provided in the side walls 26a, 26b of the machine space 21, which also form the external walls of the rail vehicle. The fans 27 take ambient air into the rail vehicle through the side walls 26 into the machine space, with each of the ventilation units being assigned to one of the internal combustion engine-machine combinations, i.e., the air flow taken in cools primarily the associated combination. The air outlet is provided, e.g., in the roof area of the machine space. The fans are operated particularly depending on the temperature measuring values that are measured by the temperature sensor 25 assigned, in each case, to the same internal combustion engine-machine combination.

The cooling air taken in by the fans from outside during their operation at first flows along the internal combustion engine DM and then past the electrical machine G until the warm cooling air exits through the roof into the atmosphere.

In the embodiment in FIG. 3, in particular, the temperature sensors are disposed in the machine space in such a way that the components to be protected from excessive temperatures such as the coupling between engine and machine, the electrical machine contactors and the vibration dampers 23 can be monitored for excessive temperatures. Therefore, in particular, more temperature sensors than shown in the embodiment of FIG. 3 can be provided. For example, in this case, the highest temperature value of the engine-machine combination measured is used as temperature measuring value for the control of the associated ventilation unit.

Figure 4:
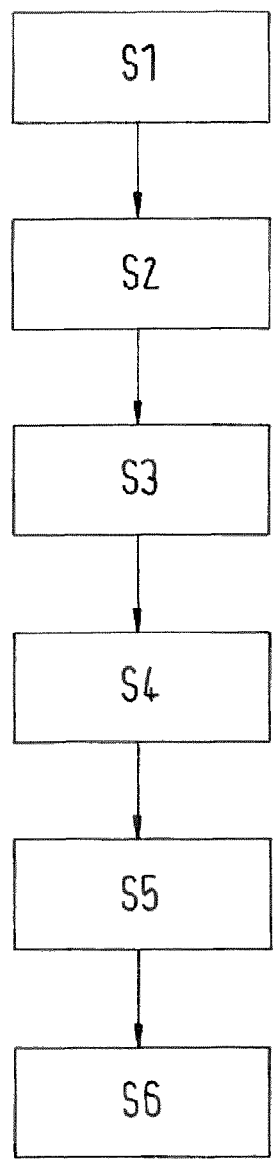

In the following, an embodiment of a method is described by which engines can be selected for operation and therefore for the generation of electrical power. This is done with reference to FIG. 4. At step S1, at the beginning of the operation of a rail vehicle, at first all internal combustion engines of the arrangement are started, optionally in succession, as is known from the state of the art. At the following step S2, some of the internal combustion engines are turned off again because only a part load operation mode is foreseen for the momentary operation phase. Alternately, not all internal combustion engines are started at step S1 so that, at step S2, no internal combustion engine is turned off or fewer internal combustion engines are turned off. More particularly, the internal combustion engine which has, or the internal combustion engines which have, not been started are preheated in this case.

At the following step S3, the temperatures of the turned off internal combustion engines are monitored. If it is found that the temperature of one of the internal combustion engines drops below a predefined temperature limit, the engine is started (again) (step S4) to avoid cooling down with subsequent preheating of the engine.

In a subsequent operation phase (step S5), which alternately can also take place before or during the operation phase of the steps S2 and S3, the temperature of at least one of the internal combustion engine-machine combinations is monitored constantly and the ventilation device for ventilating and therefore cooling the associated combination operated only when a predefined temperature limit is exceeded. When another temperature limit that is below the aforementioned temperature limit is not met, the operation of the associated ventilation unit is waived, i.e., the unit remains turned off, even during the operation of the associated internal combustion engine. When the lower predefined temperature limit is exceeded and the associated internal combustion engine is in operation, the associated ventilation unit operates (step S6).

We claim:

1. An arrangement for supplying a rail vehicle with electrical energy, the arrangement comprising:
    at least two internal combustion engines,
    each having an associated electrical machine for generating electrical energy, wherein the electrical machine is coupled mechanically with the internal combustion engine so as to be driven by the internal combustion engine when the electrical machine is in generator operating mode so that at least one first and one second internal combustion engine-machine combination are formed,
    a common control of the internal combustion engine-machine combinations wherein the common control is designed to start the internal combustion engines individually as required,
    at least one preheating device designed to preheat the internal combustion engines before a start,
    at least one temperature determining device coupled thermally with the internal combustion engines and connected to the common control by a signal link to transfer information about temperatures of the internal combustion engines to the common control, wherein
    the common control is designed, while one of the internal combustion engines is running, to start another one of the internal combustion engines when, a temperature of the other internal combustion engine determined by the at least one temperature determining device reaches or drops below a first predefined temperature limit, and wherein,
    the common control reduces the engine power of one or more of the internal combustion engines already in operation as soon as the other internal combustion engine has started and contributes to a total engine power of all internal combustion engines in operation.

2. The arrangement as claimed in claim 1, wherein the common control starts the other internal combustion engine when the first predefined temperature limit is attained even though engine power of one or more of the internal combustion engines already in operation suffices for supplying the rail vehicle with electrical energy.

3. The arrangement as claimed in claim 1 comprising a ventilation device assigned to each of the engine-machine combinations comprised of one or more ventilation units wherein the ventilation units are activated only when the internal combustion engine of the engine-machine combination associated with it is in operation and when the temperature of the engine-machine combination associated with it satisfies a second predefined temperature limit.

4. A rail vehicle comprising the arrangement as claimed in claim 1.

5. A method for operating an arrangement for supplying a rail vehicle with electrical energy comprising:
    operating simultaneously at least two internal combustion engines, each having
    an associated electrical machine for generating electrical energy, each of which is coupled mechanically with the internal combustion engine so that in generator operating mode of the electrical machine it is driven by the internal combustion engine and at least one first and one second internal combustion engine-machine combination are formed,
    measuring information about temperatures of the internal combustion engines, with at least one temperature determining device coupled thermally to the internal combustion engines and connected to a common control, starting, while one of the internal combustion engine-machine combinations is running, one other of the internal combustion engines when, a temperature of the other internal combustion engine determined by the at least one temperature determining device attains or drops below a first predefined temperature limit, reducing the engine output of one or more of the internal combustion engines that are already in operation as soon as the other internal combustion engine has started and contributes to a total engine power of all internal combustion engines in operation.

6. The method of claim 5, further comprising the step of starting the other internal combustion engine when the first predefined temperature limit is attained even though an engine power of one or more of the internal combustion engines already in operation suffices for supplying the rail vehicle with electrical energy.

7. The method of claim 5, further comprising the steps of ventilating each of the engine-machine combinations by one or more ventilation units associated with it wherein the ventilation units are activated only when the internal combustion engine of the engine-machine combination associated with it is in operation and when the temperature of the engine-machine combination associated with it satisfies a second predefined temperature limit.

8. The method of claim 5, further comprising the step of preheating the internal combustion engines before starting the internal combustion engines.

\* \* \* \* \*